(No Model.)
J. W. BROWN, Jr.
CHERRY STONER.
No. 521,011. Patented June 5, 1894.
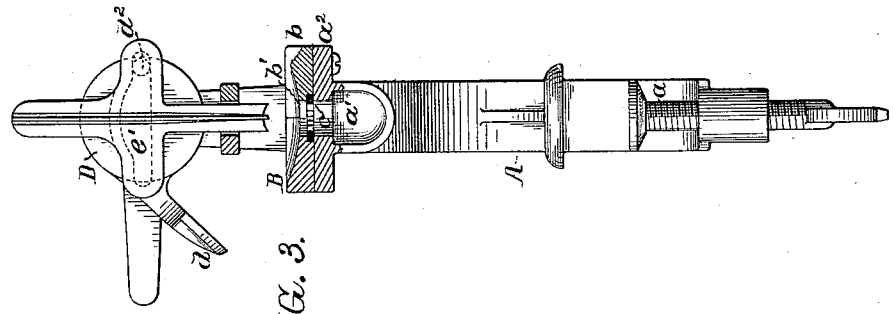
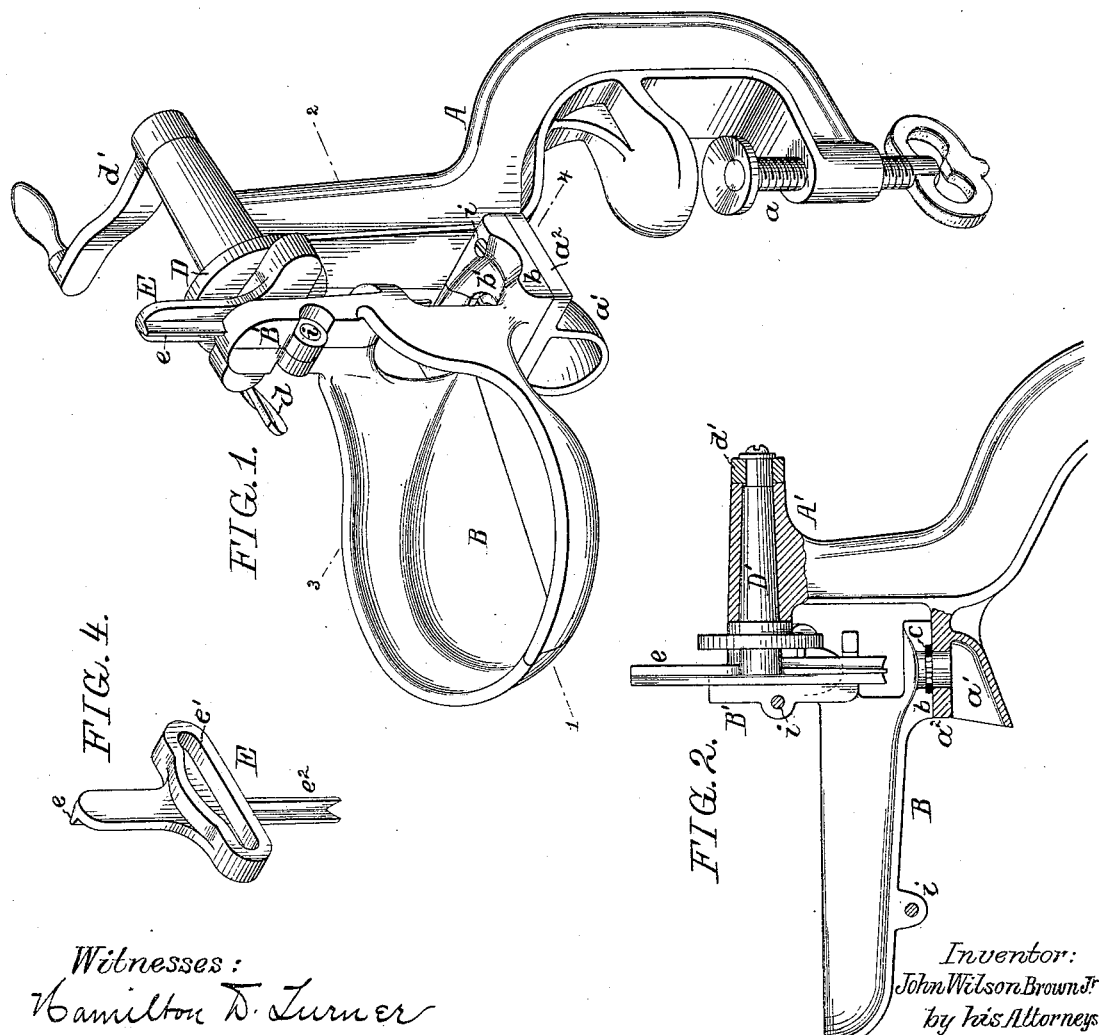
Witnesses:
Hamilton D. Turner
William A. Barr
Inventor:
John Wilson Brown Jr.
by his Attorneys
Howson & Howson

UNITED STATES PATENT OFFICE.

JOHN WILSON BROWN, JR., OF PHILADELPHIA, PENNSYLVANIA.

CHERRY-STONER.

SPECIFICATION forming part of Letters Patent No. 521,011, dated June 5, 1894.

Application filed September 28, 1893. Serial No. 486,737. (No model.)

*To all whom it may concern:*

Be it known that I, JOHN WILSON BROWN, Jr., a citizen of the United States, residing in Philadelphia, Pennsylvania, have invented certain Improvements in Cherry-Stoners, of which the following is a specification.

The object of my invention is to so construct a cherry stoner that it can be cheaply manufactured, and can be readily operated and cleaned without being dismantled. This object I attain in the following manner, reference being had to the accompanying drawings, in which—

Figure 1, is a perspective view of my improved cherry stoner. Fig. 2, is a section on the line 1—2, Fig. 1. Fig. 3, is a section on the line 3—4, Fig. 1; and Fig. 4, is a perspective view of the plunger.

A is the standard which is clamped to a table by the ordinary screw clamp $a$, and the standard is so curved that it will overhang a dish or other receptacle placed under it. Formed in the standard is the chute $a'$ for the stones that are removed from the cherries and above the chute is a plate $a^2$ to which is attached the hopper section B. A plate $b$ of this hopper section is adapted to fit over the plate $a^2$, and this plate $b$ has an opening $b'$ for the passage of the cherry stones. The plate is dished toward this opening, as shown in the drawings, forming a pocket for the cherry to be stoned, and clamped between the two plates is a washer $c$ of rubber or other flexible material, this washer is suitably cut so that with pleasure the stones will pass through the washer into the chute $a'$ and be delivered into a suitable vessel. The washer, however, is stiff enough to prevent the cherry itself passing through the washer.
The cherry is discharged to one side of the machine by an arm $d$ on a disk D carried by a shaft D' mounted in a bearing A' on the standard A, and this shaft is provided with a handle $d'$ by which it is turned, so that at each rotation of the shaft the cherry will be stoned and will be thrown into a suitable receptacle at the side by the arm.

Adapted to slide in an upright B' projecting from the hopper portion B is a plunger E having a rib $e$ adapted to a groove in the upright B'. A transverse slot $e'$ is formed in this plunger, and adapted to the slot is a pin $d^2$ on the disk D, so that as the disk is rotated, the plunger reciprocates in a vertical plane. The lower portion $e^2$ of the plunger is cruciform in shape, and the outer edges of the ribs terminate in points forming a pocket for the stone.

The mouth of the hopper B is so formed that one cherry at a time will be fed to the pocket, and the parts are so timed that the plunger passes through the cherry and forces the stone through the washer into the chute $a'$ while the arm $d$ is elevated, the arm passing across the surface of the plate $b$ when the plunger is elevated, and as soon as the arm removes the stoned cherry another cherry takes its place in the pocket under the plunger.

It will be noticed that the standard A and the bearing A' are made in a single casting in the present instance, and the hopper B is made in two parts, the division line being through the center of the hopper and the center of the plate $b$ and the two parts of the hopper are secured together by rivets or screws $i$, and the hopper section is secured to the standard by screws $i'$.

The plunger is held in position between the disk D and the upright B'; thus it will be seen that the parts can be readily made without using elaborate molds, and can be put together with very little finishing.

The moving parts are all exposed so that the machine does not have to be taken apart to be cleaned.

I claim as my invention—

1. The combination in a cherry stoner, of the standard, the hopper section secured thereto, a flexible washer, between the standard and the hopper section, a vertical reciprocating ejecting plunger mounted above the washer and adapted to pass therethrough, said plunger adapted to guides in the hopper section, a shaft mounted in the standard and connected to the plunger so as to give it the vertical reciprocating motion required, with a discharging arm carried by the shaft, substantially as described.

2. The combination of the standard, the hopper section mounted thereon, a plate $b$ forming part of the hopper section having an opening, a yielding support under said opening, a vertically reciprocating plunger mounted in the hopper section, a shaft mounted in the standard, a disk on said shaft connected to the plunger, and an arm on said disk for removing the stoned cherry from the machine, substantially as described.

3. The combination of the standard having a discharge chute therein, and a supporting plate, a hopper section having an extension or plate secured to the plate of the standard, a flexible support for the cherry to be stoned, a vertical reciprocating plunger having its lower portion cruciform in shape, and having a rib adapted to a slot in the hopper portion and a transverse slot, a shaft mounted in the standard, a disk mounted on said shaft, a pin on said disk adapted to the transverse slot, and through which the vertical reciprocating motion is imparted to the plunger, an arm fixed to said disk and adapted to remove the stoned cherry from the machine as the shaft is rotated substantially as described.

In testimony whereof I have signed my name to this specification in the presence of two subscribing witnesses.

JOHN WILSON BROWN, Jr.

Witnesses:
EDWIN C. FREEMAN,
WILLIAM A. BARR.